United States Patent
Forgue et al.

(10) Patent No.: US 8,827,650 B2
(45) Date of Patent: Sep. 9, 2014

(54) SEAL FOR A PLATFORM IN THE ROTOR OF A TURBINE ENGINE

(75) Inventors: Jean-Bernard Forgue, Montacher Villegardin (FR); Patrick Jean-Louis Reghezza, Vaux le Penil (FR); Carole Stochmil, Corbeil Essonnes (FR)

(73) Assignee: SNECMA, Paris (FR)

( * ) Notice: Subject to any disclaimer, the term of this patent is extended or adjusted under 35 U.S.C. 154(b) by 634 days.

(21) Appl. No.: 13/139,456

(22) PCT Filed: Dec. 10, 2009

(86) PCT No.: PCT/EP2009/066819
§ 371 (c)(1),
(2), (4) Date: Jun. 13, 2011

(87) PCT Pub. No.: WO2010/066833
PCT Pub. Date: Jun. 17, 2010

(65) Prior Publication Data
US 2011/0243744 A1 Oct. 6, 2011

(30) Foreign Application Priority Data
Dec. 12, 2008 (FR) ...................................... 08 58539

(51) Int. Cl.
*F01D 11/00* (2006.01)
*F01D 5/30* (2006.01)

(52) U.S. Cl.
CPC ........ *F01D 5/3007* (2013.01); *F05D 2260/941* (2013.01); *F05D 2250/70* (2013.01); *F01D 11/008* (2013.01); *Y02T 50/673* (2013.01)
USPC .................................................... 416/193 A

(58) Field of Classification Search
CPC .... F01D 11/005; F01D 11/006; F01D 11/008
USPC ....... 416/193 A; 277/637, 644, 645, 646, 647
See application file for complete search history.

(56) References Cited

U.S. PATENT DOCUMENTS 5,464,326 A * 11/1995 Knott ........................ 416/193 A
6,217,283 B1 4/2001 Ravenhall et al.
(Continued)

FOREIGN PATENT DOCUMENTS

| EP | 1 046 785 | 10/2000 |
| EP | 1 865 154 | 12/2007 |
| GB | 2 417 986 | 3/2006 |

OTHER PUBLICATIONS

U.S. Appl. No. 13/265,200, filed Oct. 19, 2011, Rechezza, et al.
(Continued)

*Primary Examiner* — Edward Look
*Assistant Examiner* — Jason Davis
(74) *Attorney, Agent, or Firm* — Oblon, Spivak, McClelland, Maier & Neustadt, L.L.P.

(57) ABSTRACT

A seal for an intermediate platform provided between two adjacent blades in the rotor of a turbine engine, the seal having an elongate shape with an upstream end and a downstream end, and including transversally, in the direction of the width thereof, a contact portion, an attachment portion, and a flexible portion between the attachment portion and the contact portion. The cross section of the seal has an open-ended shape between the two ends thereof.

11 Claims, 2 Drawing Sheets

(56) References Cited

U.S. PATENT DOCUMENTS

| | | |
|---|---|---|
| 6,634,863 B1 | 10/2003 | Forrester et al. |
| 2006/0056975 A1* | 3/2006 | Honkomp et al. ........ 416/193 A |
| 2007/0280830 A1 | 12/2007 | Mulcaire et al. |
| 2010/0150724 A1 | 6/2010 | Forgue et al. |

OTHER PUBLICATIONS

International Search Report issued Apr. 21, 2010 in PCT/EP09/66819 filed Dec. 10, 2009.

* cited by examiner

SEAL FOR A PLATFORM IN THE ROTOR OF A TURBINE ENGINE

BACKGROUND OF THE INVENTION

1. Field of the Invention

The present invention relates to the field of multispool, notably twin-spool, turbojets and more generally to that of turbine engines.

2. Description of the Related Art

A twin-spool turbojet comprises a gas turbine engine through which travels a gas flow called the main flow driving a fan delivering an airflow called the bypass flow. When the fan is placed in front of the engine, it discharges the aspirated air that is separated into two concentric flows: one being the main flow and the other being the bypass flow. The air of the main flow is compressed again and then mixed with a fuel in a combustion chamber in order to produce a gaseous flow with high energy which sets in motion the turbines placed downstream. One of the turbines is connected by a shaft to the fan rotor that it drives. The bypass flow in civil aircraft engines supplies most of the thrust of the engine and the diameter of the fan is consequently very large.

The fan rotor comprises an impeller the hub of which is secured to the drive shaft and the rim comprises blade slots oriented substantially axially. The axial direction is that of the engine shaft. The blades are engaged by their root in the individual slots and form the fan rotor. A fan blade comprises a root, an airfoil with an aerodynamic profile and a stilt between the root and the airfoil. In order to form the border surface between the rim of the rotor and the airstream and to ensure the continuity of the main stream, intermediate platforms are placed between the blades. Being different from the upper compression stages and because of the considerable dimensions of the blades, the fan rotor platforms do not form an integral part of the blades but are separate parts. It should be noted that the internal radius of the airstream increases notably between the inlet and the outlet of the fan rotor.

A clearance is arranged between the platforms and the blades in order to allow the latter a limited range of movement during the various operating phases of the engine. This clearance is plugged by a seal of elastomer attached along the lateral edges of the platform and resting against the adjacent blade.

According to the prior art, the seal is of elongate shape with a constant profile from one end to the other. Transversely, it consists of three portions: a portion for attachment to the platform, a flexible portion and a bulbous portion formed to ensure a contact with the surface of the adjacent part. The flexible portion allows the seal to be suited to the distance separating the edge of the platform from the surface of the facing blade.

It is noted that, after a certain period of operation of the turbine engine on which they are mounted, they have zones of wear and of breakage. The result of this is a loss of seal at the fan blade root. A poor seal has an impact on the flow rate and the efficiency of the compressor stages directly downstream of the fan. It also has an impact on the margin of surging.

The seals are therefore parts that need to be replaced regularly throughout the lifetime of the turbine engine to ensure optimum operation of the latter.

BRIEF SUMMARY OF THE INVENTION

The object of the present invention is to improve the achievement of the seal between the blades and the platforms of a turbine-engine rotor with free intermediate platforms for the purpose of reducing the frequency with which the seals are replaced.

The breakage of the seals is due to the stresses resulting from the deformations induced by the relative circumferential and axial movements between the platforms and the blades during the various phases of operation of the turbine machine.

The applicant has set itself the objective of modifying only the seal without acting on the rotor parts.

Observation of the torn seals shows a tendency to turn over in the portion of the seal situated downstream of the platform. This turning over causes a considerable deformation in a zone of transition with the portion of the seal that is not turned over. This zone is then the seat of stresses that are capable of leading to the seal breaking locally. Analysis shows that one origin of this deformation comes from the position in space of the seals—they are not oriented parallel to the axis of the engine but inclined sharply following the increase in the radius of the platform from upstream to downstream—the stresses to which the seals are subjected are not uniform over their length. The centrifugal forces are therefore greater on the downstream portion than on the upstream portion and cause different deformations between the upstream and downstream. The effect is increased by a non-constant clearance from upstream to downstream between the platform and the surface of the blade. The clearance reduces in the downstream direction and the bulbous portion of the seal is therefore pushed, on the circumference, toward the inside of the platform. It has therefore been found that the downstream portion of the seal was likely to press against the platform.

It is in this way that the invention manages to alleviate these drawbacks with a seal for an intermediate platform between two adjacent blades in a rotor of a turbine engine, said seal being of elongate shape with an upstream end and a downstream end, comprising transversely, widthwise, a contact portion, an attachment portion and a flexible portion between the attachment portion and the contact portion. The seal is noteworthy in that the profile of the seal has a shape with a changing cross section between its two ends, the cross section of the contact portion having a bulbous shape and reducing from one end to the other.

By selecting the shape of the seal as a function of the stresses to which it is subjected in operation in order to limit the maximum stress values, the deformations likely to exceed the braking limit of the seal are prevented.

The seal is said to have a changing section when its section is not constant from one end to the other. It reduces more particularly over a portion of its length only. The shape of the contact portion is notably oval and more particularly is circular. The flexible portion may also be changing and not constant from one end to the other for a better adaptation of the profile.

The strength of the seal is further improved by tapering at least one end. The taper consists in cutting the seal in a bevel.

The invention also relates to an intermediate platform of a turbine-engine rotor comprising a seal thus defined at least along one longitudinal lateral edge.

According to a particular embodiment, the platform is arranged so as to be mounted axially onto the rim of a rotor so as to have, at one axial end of the rotor, a diameter that is greater than that of the other end. The platform is provided with a seal in which the smallest section is on the side of larger diameter.

More particularly, since the platform has an upstream axial end and a downstream axial end with a diameter greater than that of the upstream axial end, and the seal has an upstream zone D and a downstream zone E, the upstream zone D has a constant section and a length of between half and two thirds of the length of the seal, the cross section of the downstream zone E reducing in the downstream direction.

The platform is notably arranged to be mounted on a fan rotor of a turbojet.

The invention also relates to a turbine-engine rotor comprising said intermediate platforms and more particularly to a turbojet fan rotor.

BRIEF DESCRIPTION OF THE SEVERAL VIEWS OF THE DRAWINGS

Described below is one embodiment of the invention, as a nonlimiting example, with reference to the drawings in which.

DETAILED DESCRIPTION OF THE INVENTION

Figure 1:
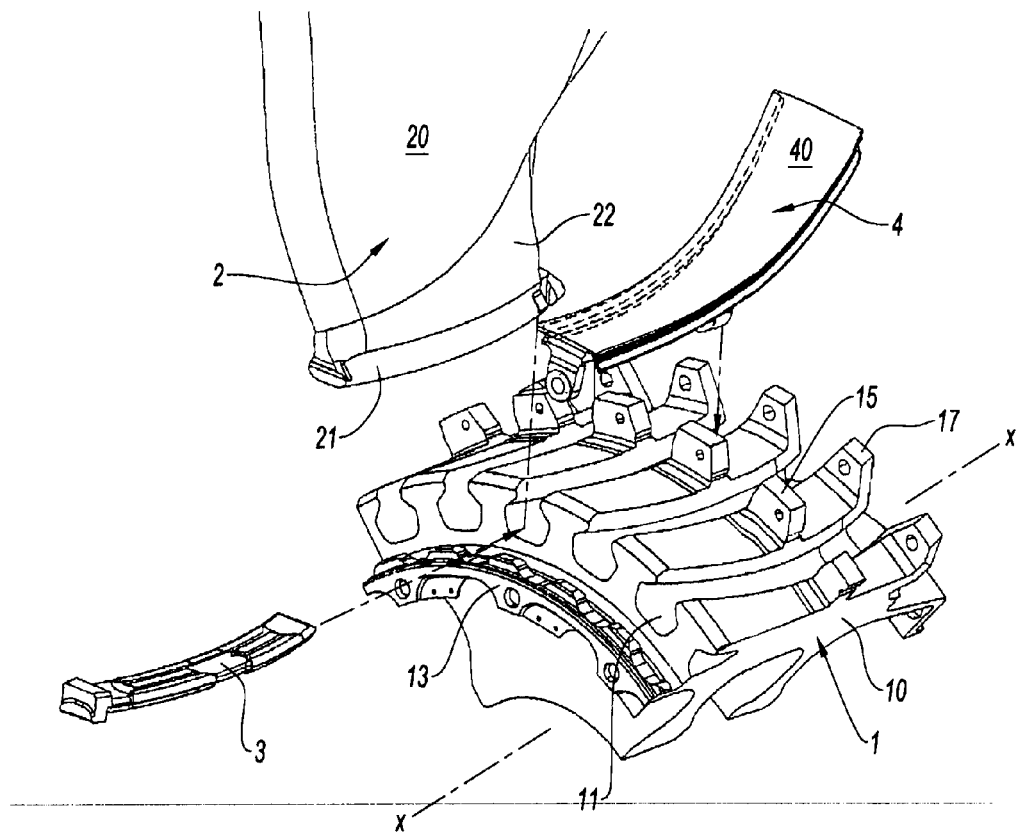
FIG. 1 shows a view in isometric perspective of a portion of a fan rotor of a twin-spool turbojet.

FIG. 1 shows in partial perspective the elements constituting a fan rotor of a twin-spool engine. The disk 1 comprises, on its rim 10, slots 11, five in the figure, oriented substantially axially relative to the axis of the engine XX. The slots have a dovetail section with longitudinal edges turned toward the axis XX. The blades are slid into the slots through one open end. A single blade 2 has been shown in position for its insertion into the slot. The blade 2 comprises a root 21, a stilt 22 and an airfoil 20. The root 21 is formed so as to be housed in a slot 11 with lateral bulges by which it presses, in the radially outward direction, against the longitudinal edges of the slot turned toward the axis XX. The root is kept under pressure by wedges 3 which, on assembly, are slid under the root 21 along the bottom of the slot 11. The device for holding the blades on the disk also comprises means, in this instance not shown, for axially locking the blades individually relative to the disk.

Figure 2:
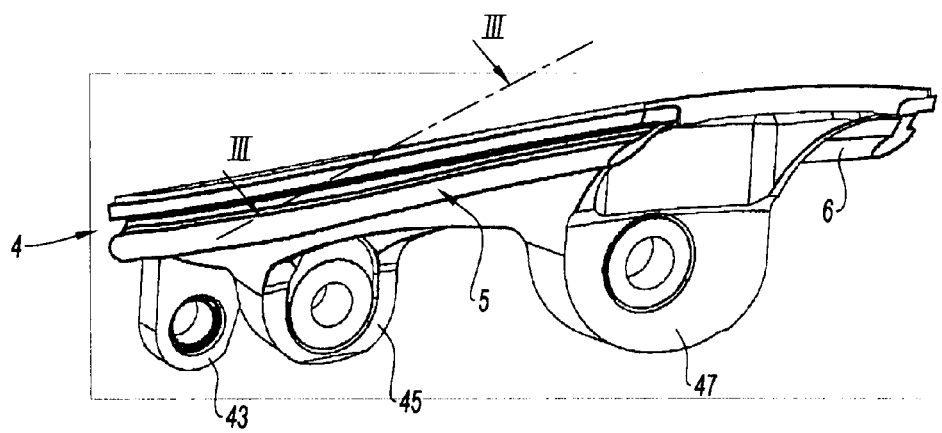
FIG. 2 shows a view in perspective of a platform with lateral seals.

The fan blades have no integrated platform, unlike the other compressor blades on the turbine engine. The function is performed by intermediate platforms that are partly free to move relative to the blades. A platform 4 is shown in FIG. 1. The rotor comprises as many platforms as there are blades. They are placed between two adjacent blades. A platform 4 comprises a plate 40 of generally frustoconical shape delimiting the surface portion that is radially inside the main airstream guided between two adjacent blades. It is held on the disk at three points and comprises three radial lugs that are clearly visible in FIG. 2. The upstream lug 43 is pierced axially and fixed by a key not shown to an upstream flange 13 on the upstream face of the disk. An intermediate lug 45, also radial, is held by a key not shown to a radial lug 15 positioned on the rim of the disk between two slots. The third lug 47 is connected to the drum of the compressor immediately downstream, commonly called the "booster" and not shown. The lug 17 supports the disk-booster connection. The keys are oriented along the axis XX and allow the platform to be held both axially and radially.

Figure 3:
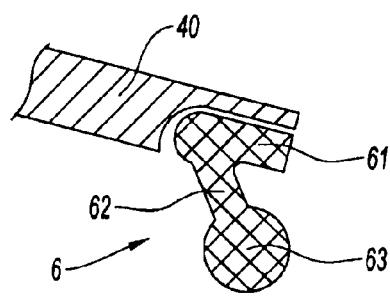
FIG. 3 represents a section of the seal corresponding to a section in the direction III-III of FIG. 2.

In order to ensure the seal between the airstream and internal volume of the rotor, seals 5 and 6 made of elastomer are placed along the platforms. One seal is shown in FIG. 3 which is a cross section in the direction III-III. The seal 6 is in three portions: an attachment portion 61, a flexible connection portion 62 and a contact portion 63. The seal is secured to the platform by bonding the attachment portion 61 in a groove arranged along the lateral edge of the plate 40 forming the platform. The contact portion preferably has a bulbous section, preferably oval or circular. Its shape ensures a good tangential contact with the adjacent part, but it also gives rigidity to the seal and provides it with inertia for a satisfactory contact. The connection portion 62 is narrower than the contact portion and is flexible so as to allow the seal to adapt. As can be seen in FIG. 3, the contact portion extends beyond the edge of the platform in order to come into contact with the adjacent surface of the blade.

When the seal has a constant shape over all of its length, it is found that it deforms in a nonuniform manner. The deformations create stresses which cause breaks that are detrimental for the seal.

Figure 4:
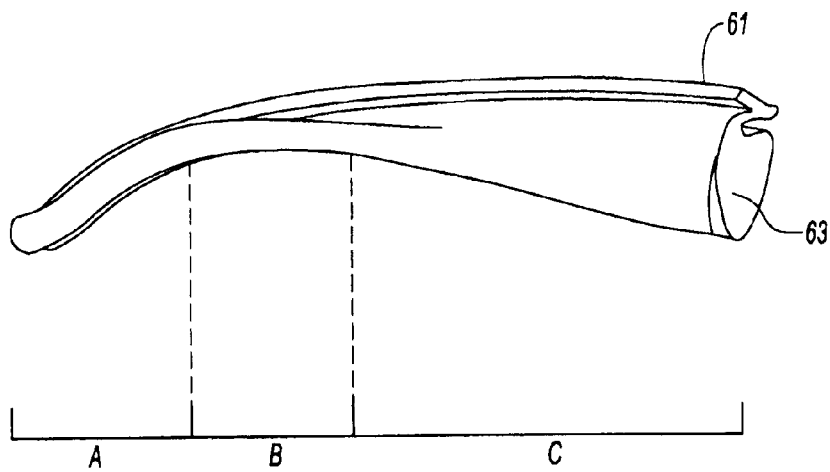
FIG. 4 shows a simulation of the possible deformation of the seal of the prior art.

FIG. 4 represents a simulation of the deformations which the seal is likely to sustain in operation. There are three zones. A first zone A, is situated on the upstream portion of the platform where the shape of the seal corresponds to that expected when it is in place on the platform and pressing outward against the stilt of the adjacent blade. In the zone C, the seal is turned over; the contact portion 63, instead of pressing outward, is folded against the platform and beneath the latter. This undesirable position is due to the centrifugal forces combined with the lateral forces exerted by the stilt. The intermediate zone B between the zones A and C sustains a maximum deformation and is the seat of the breakages.

The solution of the invention consists in making the profile of the seal change in order to take account of the nonuniformity of the forces to which it is subjected.

Figure 5:
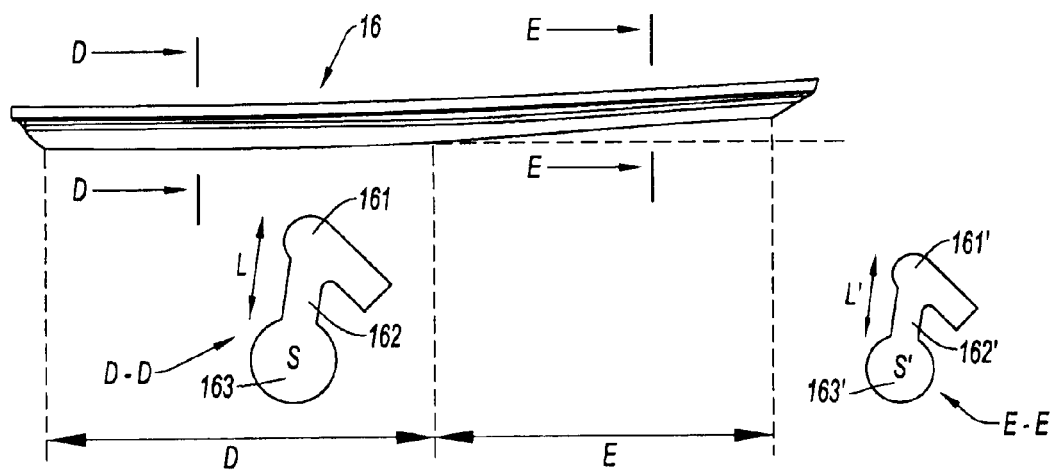
FIG. 5 shows in perspective a seal with a changing profile according to the invention, with sections in the directions D-D and E-E.

FIG. 5 represents, both in the lengthwise direction and in cross section, such a seal 16 with a changing profile.

As in the prior art, the seal has a cross section in three portions from one end to the other. It comprises an attachment portion, a flexible portion and a contact portion.

In the lengthwise direction, the upstream end and the downstream end can be seen; the upstream and the downstream correspond to the ends of the platform on which the seal is intended to be placed. Between these two ends, the seal comprises two zones, D and E respectively. In the zone D, upstream, the profile remains constant and corresponds to that of the section D-D, with an attachment portion 161 in order to be bonded to the corresponding groove of the platform, a flexible portion 162 of width L between the attachment portion and the contact portion, and a contact portion 163 in this instance with a circular section the surface of which is S.

The length of the zone D is substantially between half and two thirds of the length of the seal.

In the zone E, downstream of the zone D, the profile is not constant. The cross section along the section E-E of the seal shows an attachment portion 161' of the same shape and dimension as the attachment portion 161. The flexible portion 162' has a width L', L'<L. The contact portion 163' has a section that is also circular but its surface S' is smaller than the surface S. By reducing the width and/or the section of the contact portion, the inertia of the seal is reduced. The forces tending to turn the seal over in this portion are also reduced. By carrying out tests with the seal thus modified, no deformation that is detrimental to the integrity of the seal has been found.

Preferably, the zone of connection between the flexible portion and the contact portion is rounded and has no sharp edge so as to reduce the risks of incipient breakage.

An exemplary embodiment has been described corresponding to the case of a fan rotor of a twin-spool turbojet. In this case, the internal radius of the main airstream sustains a considerable variation between the inlet and the outlet of the airstream. Additionally, the clearance between the platform and the blade is not constant either; it reduces between the upstream and the downstream.

The invention applies more generally to any turbine engine having a similar arrangement.

The invention claim is:

1. A seal for an intermediate platform between two adjacent blades in a rotor of a turbine engine, the seal being of elongate shape with an upstream end and a downstream end, the seal comprising:
   transversely, widthwise, a contact portion, an attachment portion, and a flexible portion between the attachment portion and the contact portion,
   wherein a cross section of the seal has a changing shape between the upstream end and the downstream end,
   wherein the seal presents an upstream zone and a downstream zone between the upstream end and the downstream end,
   wherein a profile of the cross section of the seal is constant throughout the upstream zone, and
   wherein a cross section of the contact portion presents a bulbous shape, and
   wherein a profile of the cross section of the seal is not constant in the downstream zone, a width of the flexible portion in the downstream zone being less than a width of the flexible portion in the upstream zone, and a surface area of the contact portion in the downstream zone being less than a surface area of the contact portion in the upstream zone.

2. The seal as claimed in claim 1, wherein the cross section of the contact portion has a circular shape.

3. The seal as claimed in claim 1, wherein at least one of the upstream end or the downstream end is tapered.

4. An intermediate platform of a turbine-engine rotor comprising a seal as claimed in claim 1 at least along one longitudinal lateral edge.

5. A platform arranged so as to be mounted axially onto a rim of a rotor, the platform presenting a diameter that is greater at first axial end than at a second axial end and including a seal at least along one longitudinal lateral edge as claimed in claim 1, a smallest cross section of the seal being provided on a side of the platform having the larger diameter.

6. The platform as claimed in claim 5, with an upstream axial end and a downstream axial end with a diameter greater than that of the upstream axial end, and the upstream zone of the seal having a length of between half and two thirds of a total length of the seal, the cross section of the seal in the downstream zone reducing in the downstream direction.

7. The platform as claimed in claim 6, arranged to be mounted on a fan rotor of a turbojet.

8. A turbine-engine rotor comprising intermediate platforms as claimed in claim 6.

9. A rotor of a fan of a turbojet comprising intermediate platforms according to claim 6.

10. The seal as claimed in claim 1, wherein the upstream zone of the seal has a length of between one half and two thirds of a total length of the seal.

11. The seal as claimed in claim 1, wherein a shape and dimension of the attachment portion in the downstream zone is the same as a shape and dimension of the attachment portion in the upstream zone.

* * * * *